US006978607B2

(12) United States Patent
Matsumoto et al.

(10) Patent No.: US 6,978,607 B2
(45) Date of Patent: Dec. 27, 2005

(54) HYDRAULIC CONTROL SYSTEM

(75) Inventors: Satoshi Matsumoto, Kanagawa (JP); Takashi Shinke, Kanagawa (JP); Masayuki Kobayashi, Kanagawa (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 40 days.

(21) Appl. No.: 10/425,716

(22) Filed: Apr. 30, 2003

(65) Prior Publication Data
US 2003/0200747 A1 Oct. 30, 2003

(30) Foreign Application Priority Data
Apr. 30, 2002 (JP) ............................. 2002-128452
Apr. 24, 2003 (JP) ............................. 2003-120801

(51) Int. Cl.[7] ............................................. F16D 31/02
(52) U.S. Cl. ................................. 60/452; 60/422
(58) Field of Search ............................. 60/452, 445, 446, 60/422

(56) References Cited
U.S. PATENT DOCUMENTS
5,579,642 A * 12/1996 Wilke et al. ................... 60/452
5,699,665 A * 12/1997 Coolidge ...................... 60/452
6,158,462 A * 12/2000 Kashiwagi et al. ........... 60/452

FOREIGN PATENT DOCUMENTS
JP 2001-187901 7/2001

* cited by examiner

Primary Examiner—Edward K. Look
Assistant Examiner—Michael Leslie
(74) Attorney, Agent, or Firm—Pillsbury Winthrop; Shaw Pittman LLP

(57) ABSTRACT

A hydraulic control system is presented that includes a hydraulic actuator, an operation command unit that provides a first control operation signal, a directional control valve unit with a directional control valve that supplies pressure oil to the hydraulic actuator based on the first control operation signal, a variable displacement hydraulic pump having a discharge rate that changes in response to the first control operation signal, a differential pressure generating unit that generates a differential pressure between pressure of the hydraulic pump and oil pressure and outputs a second control operation signal indicative of the differential pressure. The hydraulic control system further includes a control quantity correcting unit that corrects the first control operation signal based on the second control operation signal, and a discharge rate control unit that controls the discharge rate of the variable displacement hydraulic pump based on the corrected first control operation signal.

17 Claims, 13 Drawing Sheets

(a)

(b)

HYDRAULIC CONTROL SYSTEM

BACKGROUND OF THE INVENTION

1. Field of the Invention

The present invention relates to a hydraulic control of a construction machinery operated by hydraulic transmission such as a hydraulic shovel, specifically to a hydraulic control system drastically enhancing the system efficiency improving operating performance thereof.

2. Description of Related Art

There are a negative feedback control system (hereinafter called as "Nega-con system"), a positive feedback control system (hereinafter called as "Posi-con system"), and a load sensing system, etc. as the hydraulic control system of the hydraulic shovel.

The matters in question of the above each conventional system are explained below.

Nega-con System:

FIG. 14 illustrates a hydraulic circuit diagram of the Nega-con system.

In the system, there is provided with a pressure generating means at an outlet of a center bypass passage in a directional control valve with a center bypass passage. The pressure generating means causes the pressure at its upstream to operate as a pressure signal on a control mechanism of pump discharge rate. The control mechanism of pump discharge rate operates to increase the discharge rate in accordance with lowering of the pressure signal.

The system provides preferred operating performance to the hydraulic shovel which an operator handles and therefore is in heavy usage, because a signal fed back to the pump from the directional control valve is low pressure, and pressure oil is supplied to an actuator bleeding-off a part of the pressure oil discharged from the pump. In the case, however the pressure oil supplied to the directional control valve from the pump is cast away in the form of heat as a part of the oil is discharged through the center bypass passage to a tank while the directional control valve is in neutral position or on the way of operation. Particularly in case that a hydraulic actuator connected to the valve is in the type of heavy load, that is, requires large volume of pressure oil to actually start to move and therefore the operation quantity of the directional control valve is large, there is still a problem that the pressure oil is cast away during the time interval and as the result energy is cast away uselessly, though the discharge rate of the pump is held to be small by the pressure oil.

On the other hand it is possible to relatively drop the pressure oil quantity discharged from the center bypass, for instance, by narrowing the center bypass passage of the directional control valve. However, it is very difficult to appropriately adjust areas and timing between the opening of the center bypass passage and the aperture passage to the cylinder port in the directional control valve.

Furthermore, depending on machining accuracy and valve operation, pressure oil discharged from the pump is trapped in a passage of supply lines to cause abnormally high pressure generation that rather deteriorates energy efficiency.

In the hydraulic control system used for the hydraulic shovel, the operating performance under the condition that a plurality of actuators are operated at the same time, that is, characteristics of flow distribution to each hydraulic actuator from the variable displacement hydraulic pump is very important. In general, this characteristics is uniquely defined by aperture areas in each valve on discharge flow rate of the pump at prescribed revolution numbers. Accordingly, there is still a problem that preferred operating performance may not be maintained when revolution numbers of an engine or load pressure change.

Posi-con System:

FIG. 15 illustrates a hydraulic circuit diagram for the Posi-con system.

In the system, pressure oil discharged from a variable displacement hydraulic pump with a control mechanism of the pump discharge rate is supplied to directional control valves with a center bypass passage. The discharge rate of the pump is controlled by operation signals to the valves in such a way that the discharge flow rate of the pump increases in accordance with increase of operation quantity to the valves.

In the Posi-con system, there is a similar problem as in the Nega-con system, in view of system efficiency and operating performance in combined operations in spite of the preferred operating performance, because a part of the pressure oil is discharged through the center bypass passage to a tank while the valve is in neutral position or on the way of operation.

In particular, the discharge rate is uniquely defined in accordance with the operating signals to the valves regardless of opening degree at the center bypass passage. Therefore it is very difficult to adjust areas and timing between the opening of the center bypass passage and the aperture passage to the cylinder port, so there is still a problem that abnormally high pressure generation and delay of rising in pressure may cause in the passage of supply lines from the pump.

In addition, it can be said that the Posi-con system is preferred in response compared with other systems, because the discharge rate of the variable displacement hydraulic pump is controlled by a signal output in parallel with operating signals to the directional control valves.

Load Sensing System

FIG. 16 illustrates a hydraulic circuit diagram of the load sensing system. In the system, as to the oil quantity for supply to the hydraulic actuator, the discharge rate of the variable displacement pump is controlled so that differential pressure at meter-in side of the directional control valve concerned is constant. Accordingly, there is no pressure oil throttled and cast away as in the Nega-con system and the Posi-con system, and system efficiency is improved by the extent.

However, the differential pressure at meter-in side must be maintained on some level, for instance, more than 20 bars in order to control the pump discharge rate appropriately, and as the result, pressure drop occurs in the pressure oil when it passes through each the valve regardless of the quantity. Thus, there is still a problem in view of system efficiency. Furthermore, as to the control of the pump discharge rate, there is another problem of delay in response, because first, the directional control valve is operated, and then, as the result, the pump discharge rate is controlled.

SUMMARY OF THE INVENTION

The inventors of the present invention have dedicated in examining and investigating to solve the problems mentioned above, and found out that those problems could be solved by applying differential pressure between the pressure at the discharge side of the variable displacement hydraulic pump and the pressure of pressure oil supplied to the hydraulic actuator from the directional control valve, to the operation command instructed by an operator.

Accordingly, the object of the present invention is to provide a hydraulic control system having preferred operating performance, response and stability, and drastically enhancing the system efficiency.

To achieve the object, the hydraulic control system according to the present invention comprises a hydraulic actuator for carrying out predetermined operation by means of pressure oil supply, a directional control valve unit including a directional control valve for supplying pressure oil to the hydraulic actuator in response to an operation signal given from an operation command unit, a variable displacement hydraulic pump for supplying pressure oil to the directional control valve, which discharge rate changes in response to an operation signal given from the operation command unit, a differential pressure generating unit for generating differential pressure between pressure at a discharge side of the variable displacement hydraulic pump and pressure in pressure oil supplied to the hydraulic actuator from the directional control valve, a control quantity correcting unit for correcting the operation signal to the variable displacement hydraulic pump from the operation command unit, and a discharge rate control unit for controlling discharge rate of the variable displacement hydraulic pump.

Further, to achieve the object, the hydraulic control system according to the present invention is so constituted that, in a hydraulic control system provided with a plurality of directional control valves connected in parallel with a variable displacement hydraulic pump equipped with a discharge rate control means, a hydraulic actuator connected to each directional control valve, a tank for oil return from each directional control valve, a pilot operated valve for operating the directional control valves so as to cause pressure oil discharged from the variable displacement hydraulic pump to be supplied to the hydraulic actuator and cause oil return from the hydraulic actuator to be discharged to the tank, and a flow dividing compensation valve located between each directional control valve and hydraulic actuator, the hydraulic control system further comprises: a first control signal generating means for generating a discharge rate control signal X to control the discharge rate of the variable displacement hydraulic pump with respect to an operation signal to the directional control valve, a first pressure detecting means for detecting pressure Pd in pressure oil discharged from the variable displacement hydraulic pump, a second pressure detecting means for detecting pressure Pu at upstream of the flow dividing compensation valve, which locates at downstream of a variable aperture portion formed between a supplying line for the pressure oil and a cylinder port in each directional control valve, a hydraulic circuit for applying the pressure Pu detected by the first pressure detecting means to the flow dividing compensation valve concerned so as to operate in the direction of open, and for applying a maximum pressure Ps to the flow dividing compensation valve concerned so as to operate in the direction of close, the maximum pressure Ps being selected as the highest pressure among the detected pressure Pu corresponding to each directional control valve, and a second control signal generating means for generating a discharge rate control signal Y to control the discharge rate of the variable displacement hydraulic pump so that the differential pressure (Pd-Ps) between the maximum pressure Ps and the pressure Pd is held within a predetermined value, the discharge rate control means being controlled by the discharge rate control signals X and Y, thereby controlling the discharge rate of the variable displacement hydraulic pump.

In the case, the flow dividing compensation valve can be located at a passage for oil return to the tank from the directional control valve.

Also, in the case, one or more of the flow dividing compensation valves corresponding to each of a plurality of the directional control valves can be located at a passage for oil return to the tank, and others can be located at a passage between the directional control valve and the actuator concerned.

Further, in the case, the discharge rate control signal X can be given priority over the discharge rate control signal Y in order to apply to the discharge rate control means of the variable displacement hydraulic pump when a specific hydraulic actuator is operated.

Further, in the case, there can be provided with a delay means for delaying an output of the discharge rate control signal Y to the discharge rate control signal X with respect to fluctuation of differential pressure.

Further, in the case, there can be provided with a block means for blocking the output of the discharge rate control signal Y to the discharge rate control signal X.

Further, in the case, there can be provided with a limit means for limiting range of the output of the discharge rate control signal Y to the discharge rate control signal X.

Further, in the case, there can be provided with a shunt circuit for hydraulically shunting between a front port and a rear port of the flow dividing compensation valve by taking away one or all of the compensation valves with respect to the directional control valves.

Also, in the case, there can be provided with an operational amplifier for amplifying at least electrical signals based on operation quantity of the pilot operated valve and electrical signals based on the detected pressures Pd, Ps, the electrical output of the amplifier being applied to the discharge rate control means of the variable displacement hydraulic pump.

Further, in the case, the discharge rate control means can be constituted by a solenoid-operated proportional reducing valve that operates as an electro-hydraulic converter.

Further, in the case, there can be provided with a servomotor for controlling discharge rate of the variable displacement hydraulic pump.

Still further, in the case, there can be provided with a pair of the hydraulic control systems, wherein a single actuator can be connected to the directional control valve in the respective hydraulic control system.

Furthermore, to achieve the object, the hydraulic control system according to the present invention is so constituted that, in a hydraulic control system provided with a plurality of directional control valves connected in parallel with a variable displacement hydraulic pump equipped with a discharge rate control means, a hydraulic actuator connected to each directional control valve, a tank for oil return from each directional control valve, a pilot operated valve for operating the directional control valves so as to cause pressure oil discharged from the variable displacement hydraulic pump to be supplied to the hydraulic actuator and furthermore cause oil return from the hydraulic actuator to be discharged to the tank, and a flow dividing compensation valve located between each directional control valve and hydraulic actuator, the hydraulic control system further comprises:

a first control signal generating means for generating a discharge rate control signal X to control the discharge rate of the variable displacement hydraulic pump with respect to an operation signal to the directional control valve, a second control signal generating means for generating a discharge rate control signal Y to control the discharge rate of the variable displacement hydraulic pump so that the differential pressure (Pd-Ps) between the maximum pressure Ps and the pressure Pd is held within a predetermined value, the discharge rate control means being controlled by the discharge rate control signals X and Y to control the discharge rate of the variable displacement hydraulic pump, a first pressure detecting means for detecting pressure Pd in pressure oil discharged from the variable displacement hydraulic pump, a second pressure detecting means for detecting pressure Pu at upstream of the flow dividing compensation valve, which locates at downstream of a variable aperture portion formed between a supplying line for the pressure oil and a cylinder port of each directional control valve, a hydraulic circuit for applying the pressure Pu detected by the first pressure detecting means to the flow dividing compensation valve concerned so as to operate in the direction of open, and for applying a maximum pressure Ps to the flow dividing compensation valve concerned so as to operate in the direction of close, the maximum pressure Ps being selected as the highest pressure among the detected pressure Pu corresponding to each directional control valve, a flow control valve with pressure compensation located at a bypass line branched out from a pump supplying line of the variable displacement hydraulic pump for receiving the detected pressure Pd in the direction of open, and for receiving the detected maximum pressure Ps and spring force in the direction of close, a pressure generating means located at the bypass line and connected to the flow control valve with pressure compensation, a third pressure detecting means for detecting pressure at a location between the flow control valve with pressure compensation and the pressure generating means, and a variable reducing valve that reduces its secondary pressure in accordance with increase of the pressure detected by the third pressure detecting means, whereby the discharge rate control signal Y is applied to the variable reducing valve, and the discharge rate control signal X is applied as a primary pressure to the variable reducing valve.

In the case, spring force for setting differential pressure in the flow control valve with pressure compensation can be controlled by an external signal.

Also, in the case, spring force for setting differential pressure in the flow control valve with pressure compensation can be reduced when a specific actuator is operated.

Further, in the case, opening degree of the pressure generating means located at the bypass line can be controlled by an external signal.

Also, in the case, the discharge rate control signal X can be controlled in accordance with fluctuation of revolution of an engine or the variable displacement hydraulic pump by detecting the revolution number.

Function of the Present Invention

When each directional control valve is in the neutral position, the pressure oil supply through the discharge line of the variable displacement hydraulic pump is stopped. Further, a pressure oil signal at the output side of the directional control valve is connected to the tank through a solenoid-operated on-off valve with a throttle. Accordingly, the pressure oil signal is low.

On the other hand, a pressure oil signal at the discharge line of the variable displacement hydraulic pump delivers the flow control valve with pressure compensation against spring force thereof, and it is discharged through the pressure generating means to the tank.

Oil quantity passing through the flow control valve with pressure compensation becomes to minimum, because the discharge rate of the variable displacement hydraulic pump is held to be minimum when a pressure Po applied to the discharge rate control means for the variable displacement hydraulic pump is low. The opening degree of the pressure generating means is controlled so that a predetermined pressure is generated by the minimum quantity.

When the pressure oil corresponding to the minimum quantity passes through the pressure generating means, pressure at a signal line C rises because of the throttle effect, therefore the discharge rate of the variable displacement hydraulic pump is held to be minimum regardless of the pressure oil signal Pi.

This minimum discharge rate can be very small depending on a mechanism of the pressure generating means and the discharge rate control means. So, energy loss can be suppressed at minimum level.

BRIEF DESCRIPTION OF THE DRAWINGS

The above and other objects, features, and advantages of the present invention will be made more apparent from the description of preferred embodiments with reference to the accompanying drawings wherein:

FIG. 9 is illustrative of one flow dividing compensation valve located at a discharge line to the tank from the directional control valve.

DETAILED DESCRIPTION OF A PREFERRED EMBODIMENT OF THE INVENTION

Referring to FIG. 1 to FIG. 13, preferred embodiment of the present invention will be explained below.

Figure 1:
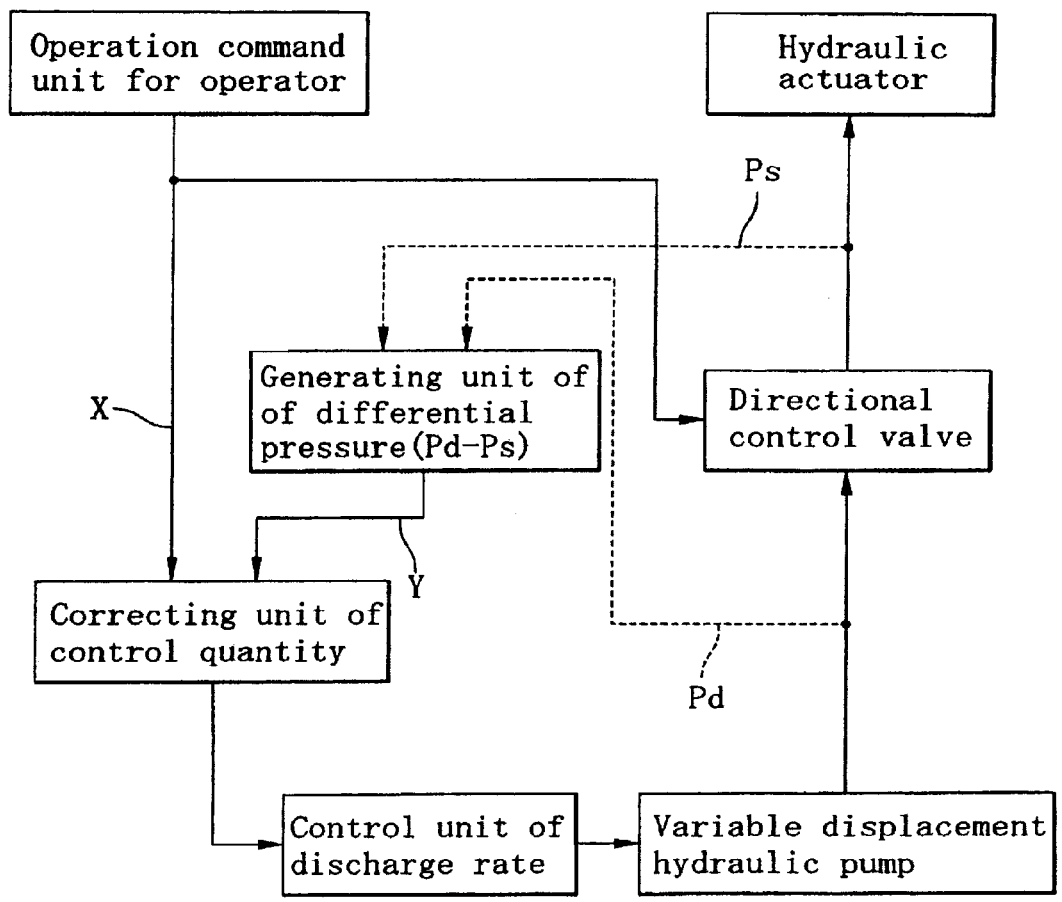
FIG. 1 is a control block diagram showing a basic concept of the present invention.

FIG. 1 shows a conceptual control block diagram of the present invention. In FIG. 1, discharge rate of the variable displacement hydraulic pump is controlled by the control unit of discharge rate. The pressure oil discharged from the variable displacement hydraulic pump is supplied to one or a plurality of hydraulic actuators through the directional control valve unit including one or a plurality of directional control valves and the peripheral hydraulic circuits thereof.

The operation command unit instructs direction and quantity for operating each hydraulic actuator as a pilot operated pressure oil signal to each directional control valve. Further, the operation command unit instructs a discharge rate control signal X as a pressure oil signal to the correcting unit of control quantity. This pressure oil signal X is selected as the highest pressure oil signal among the pilot operated pressure oil signals.

On the other hand, interleaving the directional control valve, that is, at upstream and downstream of the valve, pressure Pd of pressure oil discharged from the variable displacement hydraulic pump and pressure Ps of the pressure oil supplied to the hydraulic actuator are detected. The differential pressure is produced at the generating unit of differential pressure (Pd-Ps). The discharge rate control signal Y output from the generating unit of differential pressure as a pressure oil signal is given to the correcting unit of control quantity. In the correcting unit of control quantity, the discharge rate control signal X is reduced by applying the discharge rate control signal Y. Then, the output of the correcting unit is given to the control unit of discharge rate. Namely, maximum pressure in operation signals to the directional control valve is corrected in accordance with the differential pressure (Pd-Ps) and given to the control unit of discharge rate.

Figure 2:
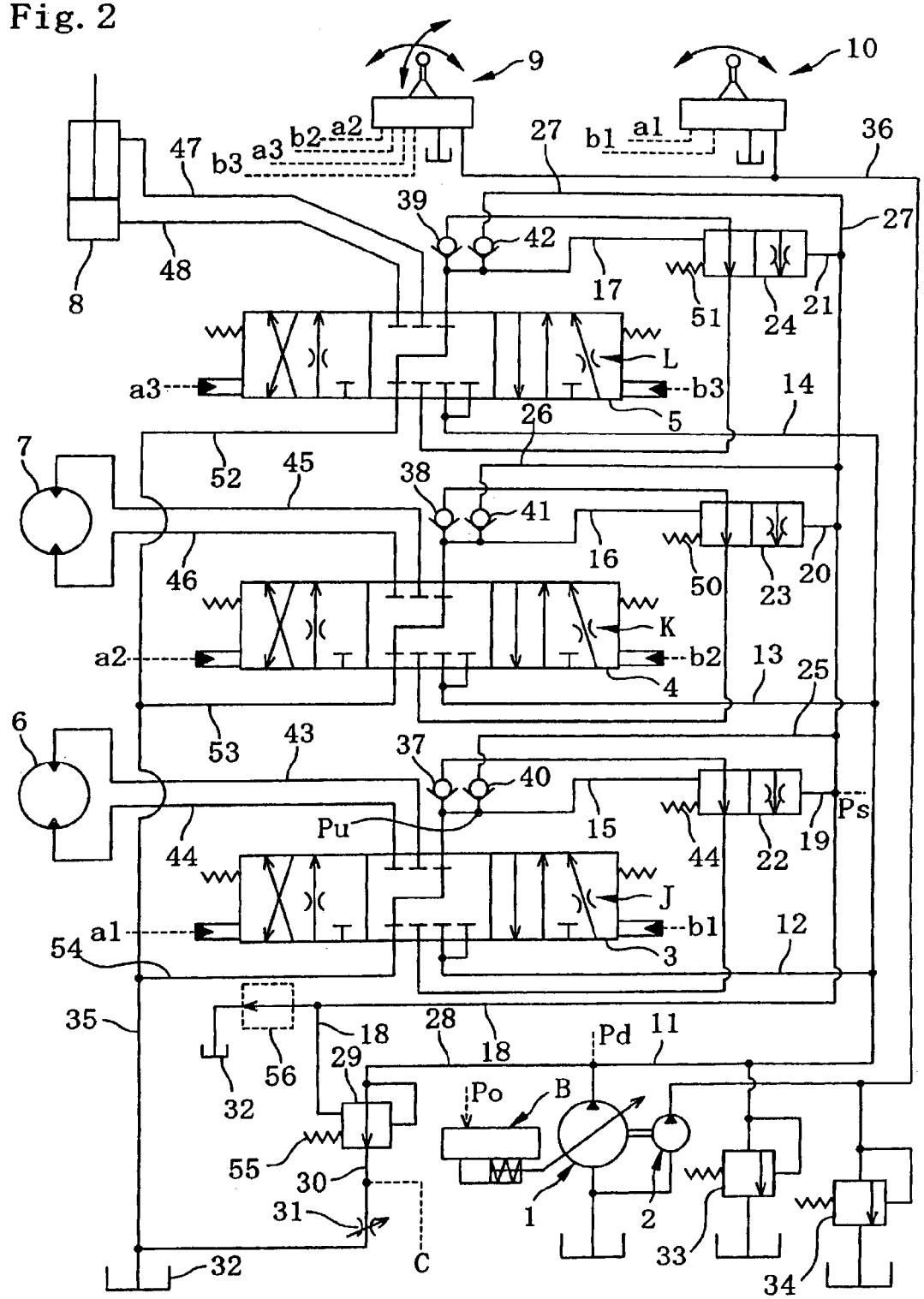
FIG. 2 is a detailed hydraulic circuit diagram of the hydraulic control system in which the present invention is applied.

FIG. 2 shows a detailed hydraulic circuit diagram of the hydraulic control system in which the present invention is applied.

In FIG. 2, reference numeral 1 is a variable displacement hydraulic pump equipped with a discharge rate control mechanism B of the pump. Reference numeral 2 is a pilot operated pump. The variable displacement hydraulic pump 1 is connected to a supplying line 11 for discharged pressure oil. There are directional control valves 3, 4 and 5, each being connected in parallel with the supplying line 11.

The pressure oil is supplied to each directional control valve 3, 4 and 5 through supplying line 12, 13 and 14, respectively branched out from the supplying line 11. Also, a passage 28 is brunched out from discharge line of the variable displacement hydraulic pump 1. The passage 28 is connected through a flow control valve with pressure compensation 29 and a pressure generating means 31 to a tank 32.

Figure 7:
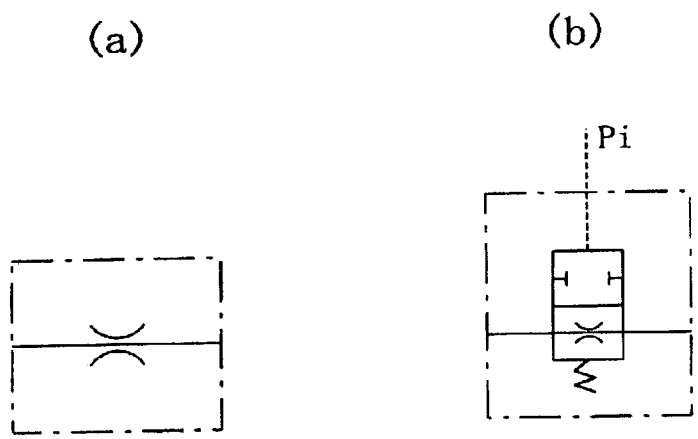
FIG. 7 shows a construction of element 56 in FIG. 2, wherein (a) illustrates a throttle, and (b) illustrates a two-positioned directional control valve.

Further, the opening degree corresponding to oil quantity passing through the flow control valve with pressure compensation 29 is so controlled that the force produced by differential pressure between the passage 28 and pressure oil signal line 18 becomes equal to that of the spring 55. In addition, the signal line 18 is connected to the tank 32 through an element 56, that is, throttle 56 or solenoid-operated on-off valve with throttle 56 as shown in FIG. 7.

Discharged pressure oil from the pilot operated pump 2 is supplied to the pilot valves 9 and 10. The secondary pressure oil produced by operating the pilot valves 9, 10 is applied through pilot lines a1, b1, a2, b2, a3, and b3 to each operating port of the directional control valves 3, 4, and 5, thereby operating the valves 3, 4 and 5, respectively.

Further, each of the valves 3, 4 and 5, for instance, the directional control valve 3 is operated in the direction of left in FIG. 2 by applying to the pilot line b1 a pilot pressure oil signal given from the pilot valve 10 when it operates. So, when the valve 3 is operated, a pressure oil supplying line 12 is connected through a variable aperture portion J, a check valve 37 and a flow dividing compensation valve 22 to a line 43 for an actuator 6.

In addition, a signal line 15 is branched out from a location between the check valve 37 and the directional control valve 3. The pressure on the line 15 is applied together with a spring 49 to the flow dividing compensation valve 22 in the direction of open. Also, a signal line 25 is branched out through a check valve 40 from the signal line 15 and is connected to a signal line 18. The pressure on the line 18 is applied to the flow dividing compensation valve 22 in the direction of close. Those hydraulic circuit constructions are the same in the directional control valves 4 and 5, and the detailed explanation is omitted.

Each of directional control valves 3, 4 and 5 is connected through lines 54, 53, 52 and a line 35 to the tank 32.

Figure 3:
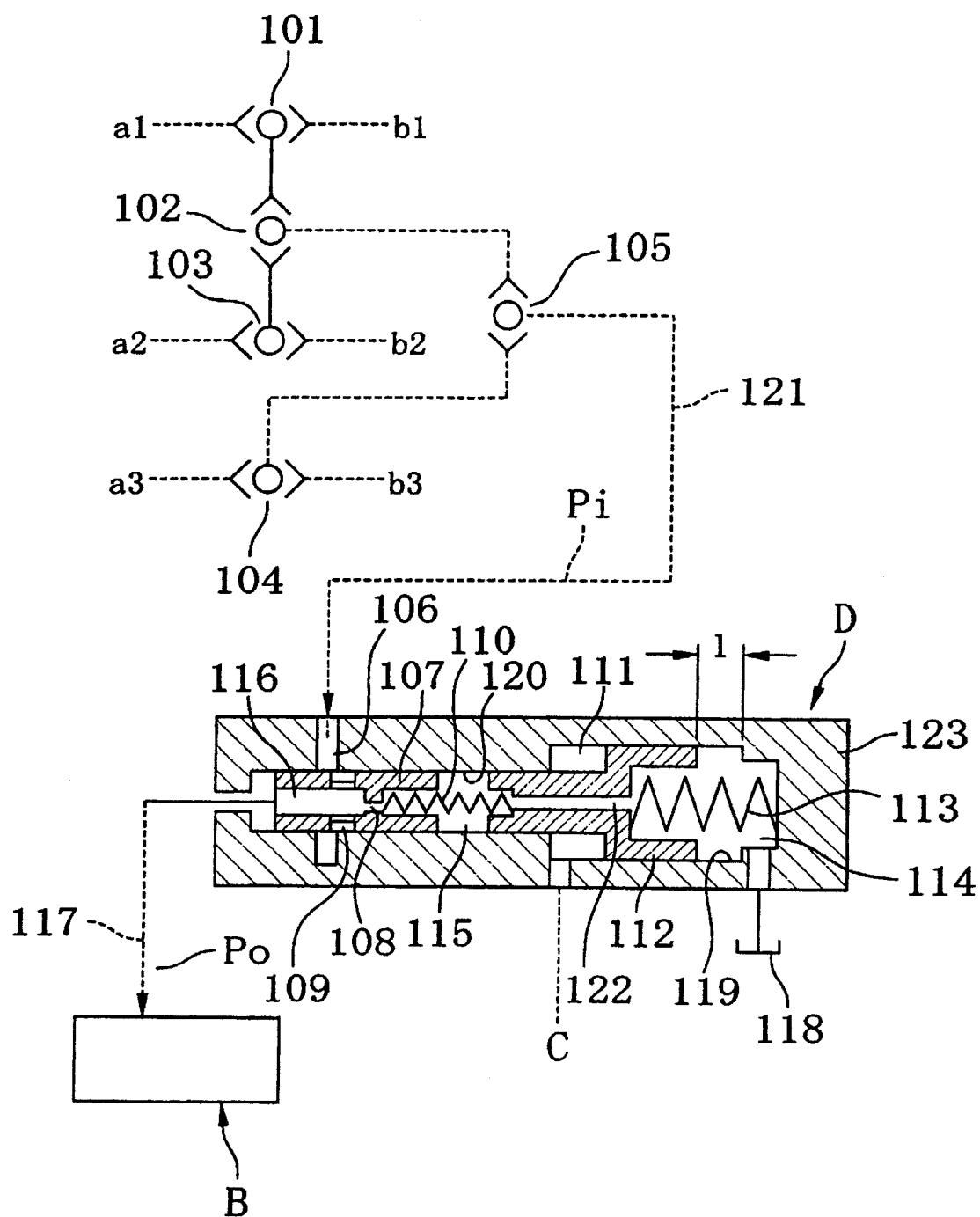
FIG. 3 is illustrative of a hydraulic circuit device generating a pressure oil signal Po applied to a discharge rate control mechanism B in FIG. 2.
Figure 4:
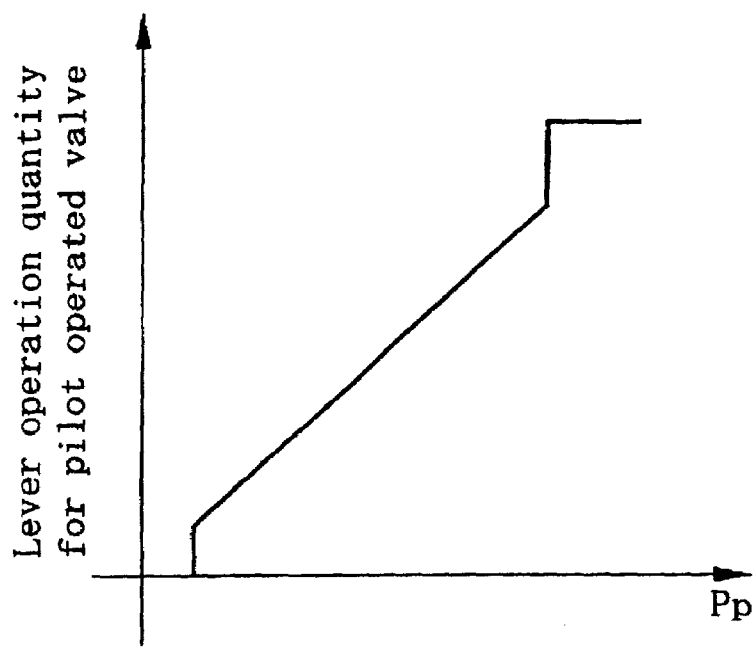
FIG. 4 is a graph illustrating the relationship between the output signal and the operation quantity of a pilot operated valve.

FIG. 3 shows a hydraulic circuit device generating a pressure oil signal Po applied to the discharge rate control mechanism B in FIG. 2.

In FIG. 3, each pressure oil signal on the pilot lines a1, b1, a2, b2, a3, and b3 is applied to higher pressure selection means 101, 102, 103, 104 and 105, and as the result, a maximum pressure oil signal among those on the pilot lines is selected, which is lead through a signal line 121 to an oil passage 106 formed in a valve D. The valve D is a reducing valve of the type with its secondary pressure variable. Therefore, the valve D functions so that it receives supplying pressure, that is, its primary pressure Pi from the line 121 and outputs its secondary pressure Po to a line 117.

A body 123 of the valve D has concentric bores 120 and 119, each with different diameter. A piston 107 is mounted in the one bore 120 with small diameter slidably and with sealed hydraulically.

Furthermore, a shoulder piston 112 is mounted in a bore with a step formed by the bores 119 and 120. The shoulder piston 112 is mounted in the bores slidably and with sealed hydraulically.

An oil chamber 111 receives through a signal line C hydraulic pressure of a passage 30 on the branch passage 28, that is, pressure at upstream of the pressure generating means 31. A spring 110 is mounted between the piston 107 and the shoulder piston 112, and in engagement with them.

In addition, the shoulder piston 112 receives force by the spring 113 in the direction of compression of the spring 110. The force pushes the shoulder piston 112 in the direction of left in FIG. 3 when the pressure is absent in the chamber 111.

An oil chamber 115 is connected through an inner passage 122 to an oil chamber 114 which is connected to a tank 118.

In such a hydraulic circuit combination shown in FIG. 3, when the pilot operated pressure oil signal is applied through the line C to the chamber 111, the pressure in the chamber 111 acts on the shoulder piston 112 to move against spring force of the spring 113. Together, mounting length of the spring 110 becomes longer than the length before the shoulder piston 112 moves. Namely, the load to the piston 107 by the spring 110 in the direction of left becomes low in accordance with rising of the pilot operated pressure oil signal applied to the chamber 111.

Figure 6:
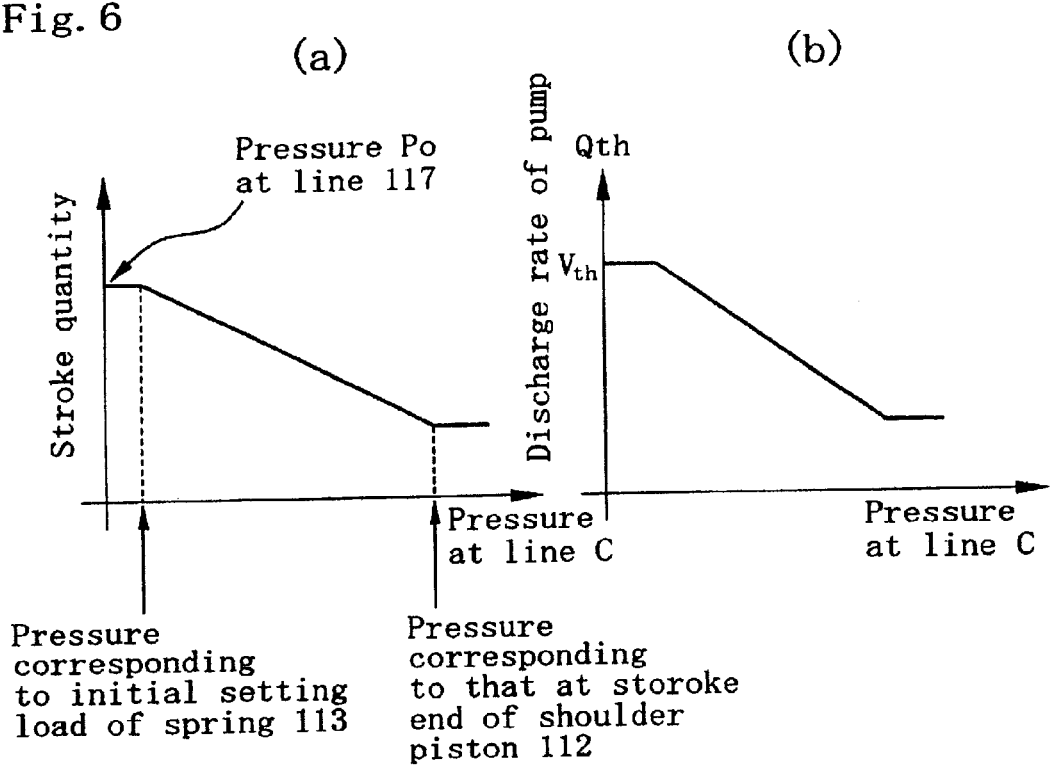
FIG. 6 is a graph showing characteristics of the valve D in FIG. 3, wherein (a) illustrates stroke quantity, and (b) illustrates discharge flow rate.

Incidentally, the piston 107 is provided with a groove 109 at its circumference portion, through which an oil chamber 116 is connected to a passage 106. Also, the piston 107 is provided with a throttle 108 through which the chamber 116 is connected to the chamber 115. By constituting the valve D as explained above, the valve D acts as a reducing valve in which secondary pressure (chamber 116) becomes low in accordance with rising of the pressure applied to the chamber 111. FIGS. 6 (a) and (b) show characteristics of the valve D.

Figure 5:
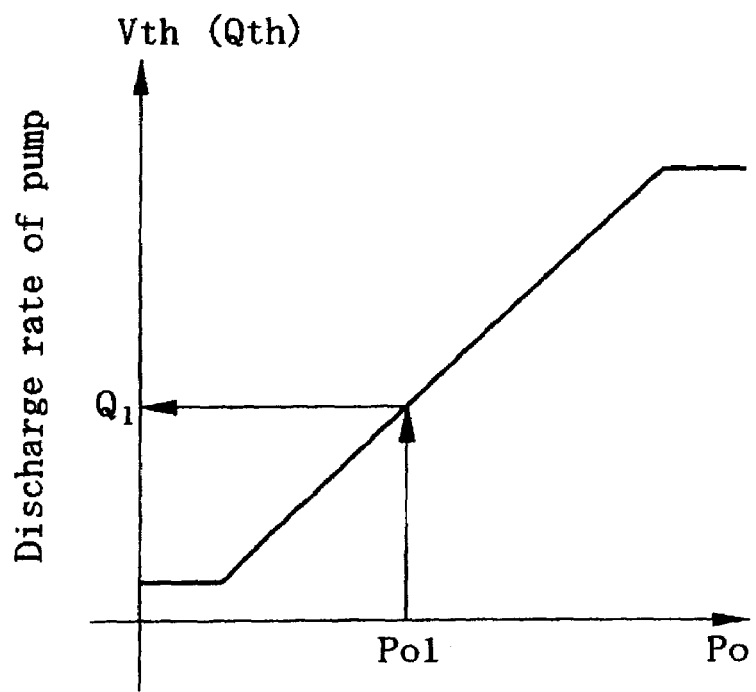
FIG. 5 is a graph illustrating the relationship between the pressure oil signal Po applied to a discharge rate control mechanism of the variable displacement hydraulic pump and the discharge rate of the pump.

In addition, the discharge rate control mechanism B for the variable displacement hydraulic pump has characteristics shown in FIG. 5. This embodiment shown in FIG. 5 is so called Posi-con system of the type that the discharge rate of pump (Vth) increases as rising of the pressure Po applied to the mechanism B.

Referring to FIG. 2 and FIG. 3, operation of the system is explained below.

The variable displacement hydraulic pump 1 and the pilot operated pump 2 are driven by a motor such as an engine (not shown). In case that each of the directional control valves 3, 4 and 5 is in the neutral position, as shown in FIG. 2, pressure oil supply to the valves 3, 4 and 5 from the discharge line 11 of the variable displacement hydraulic pump 1 is stopped.

The pressure on the signal line 18 is connected through the throttle 56 of FIG. 7 (a) or the solenoid-operated on-off valve 56 with a throttle of FIG. 7 (b) to the tank 32.

Accordingly, the pressure oil signal is low.

On the other hand, pressure oil at the discharge line 11 of the variable displacement hydraulic pump 1 delivers the flow control valve 29 with pressure compensation against spring force thereof, and it is discharged through the pressure generating means 31 to the tank 32.

In this case, as described above, Oil quantity passing through the flow control valve 29 with pressure compensation becomes to minimum, because the discharge rate of the variable displacement hydraulic pump 1 is held to be minimum as shown in FIG. 5, when pressure Po applied to the discharge rate control mechanism B for the variable displacement hydraulic pump 1 is low.

The opening degree of the pressure generating means 31 is controlled so that a predetermined pressure is generated by the minimum quantity.

Namely, when the pressure oil corresponding to the minimum quantity passes through the pressure generating means 31, pressure at a signal line C rises because of the throttle effect, therefore the discharge rate of the variable displacement hydraulic pump 1 is held to be minimum regardless of the pressure oil signal Pi as shown in FIGS. 6 (a) and (b).

This minimum discharge rate can be very small depending on a mechanism of the variable displacement hydraulic pump 1 equipped with the pressure generating means 31 and the discharge rate control mechanism B, whereby under the condition that each of the directional control valves 3, 4 and 5 is in the neutral position, energy loss can be suppressed at minimum level.

Then, the operation will be explained in case that each of the directional control valves, for instance, the valve 3 receives a pilot operated pressure oil signal through the operation signal line b1 and the position is moved in the direction of left.

Figure 8:
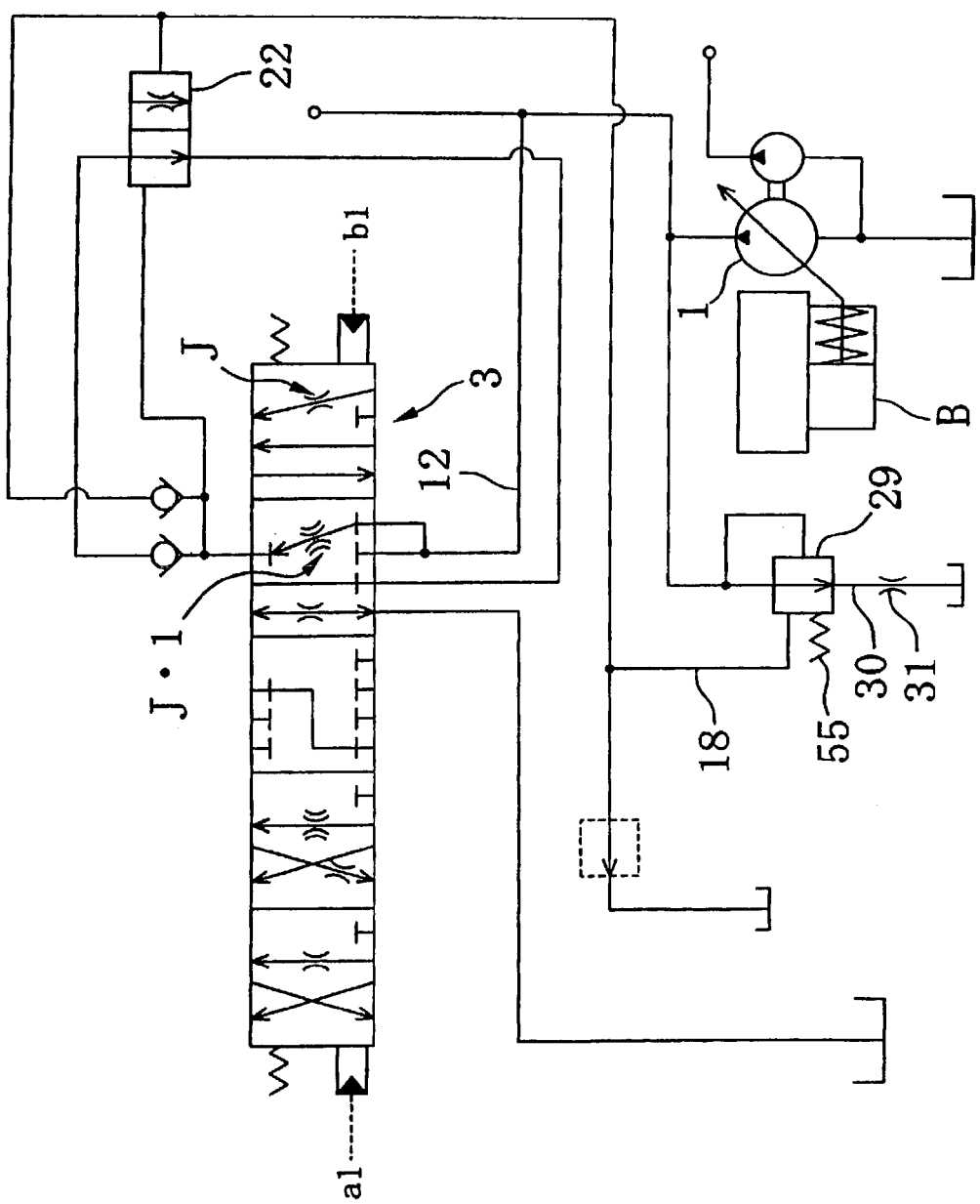
FIG. 8 is a hydraulic circuit diagram illustrating the directional control valve 3 of FIG. 2 in the half-operated state.

As shown in FIG. 8, assuming that the directional control valve 3 is in a location of middle point between the neutral position and the stroke end, and the rotational number of the variable displacement hydraulic pump 1 is fixed, the discharge rate of the pump 1 is corresponding to the pressure signal Po in accordance with the characteristics shown in FIG. 5.

In the case, the pump discharge flow rate Q determined by the pressure signal Po is supplied through the supplying line 12 to the valve 3. When the flow rate Q passes through a variable aperture portion J1, some pressure drop occurs. In case that the pressure drop is smaller than the differential pressure determined by the spring 55 for setting differential pressure of the flow control valve 29 with pressure compensation, the oil quantity supplied to the hydraulic actuator is determined by the pressure signal Po.

In general, however it is very difficult to keep preferred operating performance of the directional control valve and to appropriately adjust harmonization of opening in full range of the stroke in the valve.

Namely, in the prior art of the Posi-con system, in a given stroke range the discharged oil quantity corresponding to the pressure signal Po is excessive to the variable aperture portion J1. As the result, pressure on the supply line 12 rises needlessly and then, pressure drop at the portion J1 increases, thereby extremely reducing efficiency of the hydraulic control system.

On the contrary, in the present invention, when pressure at the supply line 12 rises abnormally, the differential pressure at the variable aperture portion increases rather than the differential pressure determined by the spring 55 for setting differential pressure of the flow control valve 29 with pressure compensation, that means increasing of differential pressure between the supply line 12, that is, the supply line 28 and the pressure signal line 18.

As the result, the flow control valve 29 with pressure compensation is opened, and a part of pressure oil on the supply line 28 is discharged. The discharged pressure oil causes the pressure of the line 30, that is, the signal line C to rise when the discharged pressure oil passes through the pressure generating means 31 and sustains flow resistance.

The pressure of the signal line C is applied to the chamber 111 of the valve D. As described, by means of operation of the valve D, the pressure signal Po as the secondary pressure of the valve D reduces until the differential pressure at the variable aperture portion J1 reaches a predetermined level (differential pressure defined by the spring 55), even if the pressure Pi of the operating signal to the directional control valve is high.

Accordingly, in case that pressure drop at the variable aperture portion J1 is less than a predetermined differential pressure, discharge rate of the pump 1 is controlled by the pressure signal Po.

On the contrary, in case that pressure drop at the variable aperture portion J1 is more than a predetermined differential pressure because pressure oil quantity supplied from the pump 1 is excessive compared with the opening of the variable aperture portion J1 at a given stroke position, the differential pressure at the variable aperture portion J1 can be held less than a predetermined value by opening the flow control valve 29 with pressure compensation, as described above.

Furthermore, in FIG. 2, the pressure oil signals given from the pilot operated valves 9 and 10 are transmitted as the pressure signal Po immediately to the discharge rate control mechanism B of the pump 1, and therefore, preferred performance in response can be achieved.

Also, since the pressure signal Po is uniquely defined by the operation quantity of the pilot operated valves 9 and/or 10, the hydraulic control system of the present invention has preferred stability under the condition that pressure drop at the variable aperture portion J1 is less than a predetermined value.

In addition, as described above, the pressure on the supply line of the pump 1 does not rise more than a predetermined value with respect to the operating pressure for hydraulic actuator. Accordingly, energy loss is very small compared with the conventional system under the condition that the discharge rate of the pump 1 is controlled by the pressure signal Po.

Incidentally, with respect to each operating port of the flow dividing compensation valve 22 when operating only the directional control valve 3 in FIG. 2, the pressure signal at upstream of the check valve 37 is applied through the line 15 in the direction of open, and is applied through the check valve 40 and signal lines 25, 19 in the direction of close, respectively. Further, the force of spring 44 is applied to the valve 22 in the direction of open. Therefore, the flow dividing compensation valve 22 is held to be in open position, thereby preventing needless pressure loss.

Then, it is assumed, for instance, that the directional control valves 3 and 4 among the valves 3, 4 and 5 operate at the same time.

Each operation of the valves 3 and 4 is the same with that in the case of single operation of the valve 3 as mentioned above. However, as for the pressure oil signal applied to the discharge rate control mechanism B of the pump 1, the maximum pressure signal is selected as shown in FIG. 3.

For instance, in case that the directional control valves 3 and 4 of FIG. 2 are operated in the direction of left by applying pilot operated pressure signals on the signal lines b1 and b2, the pressure signal corresponding to the higher pressure line among the lines b1 and b2 is applied to the discharge rate control mechanism B.

So, the variable displacement hydraulic pump 1 supplies the discharge rate of flow corresponding to the pressure signal, and at the same time, this pressure oil discharged by the pump 1 is given through supply lines 12, 13 and 14 to the directional control valves 3 and 4, respectively.

Then, the pressure oil flows through each variable aperture portion J and K of the valves 3 and 4, and causes the check valves 37 and 38 to open. Further, the pressure oil passes through the flow dividing compensation valves 22 and 23, and then is supplied to the hydraulic actuators 6 and 7.

Incidentally, in general, in case that a plurality of hydraulic actuators provided in a construction machinery operate at the same time, different operating pressures are required.

Accordingly, assuming that, in the embodiment of the present invention, the operating pressure for the hydraulic actuator 7 connected to the valve 4 is higher than that for the hydraulic actuator 6 connected to the valve 3, the pressure oil discharged from the pump1 will flow first to the valve 3. But, this flow causes some pressure drop at the variable aperture portion J of the valve 3.

On the contrary, in the valve 4 the pressures between front and rear of the variable aperture portion K are almost equal, because of no pressure oil flow at the portion K.

Therefore, comparing the pressures at each upstream of the check valves 37 and 38, the pressure at upstream of the check valve 37 is lower than that at upstream of the check valve 38. So, the pressure at upstream of the check valve 38 is lead through the check valve 41 to the pressure signal line 18. As the result, the same pressure is applied through respective pressure signal line 16 and 26 to each operating port of the flow dividing compensation valve 23 with respect to the valve 4, and the flow dividing compensation valve 23 is held to be in the delivered position of FIG. 2 by the spring force of the spring 50.

On the other hand, as for each operating port of the flow dividing compensation valve 22 with respect to the valve 3, the pressure signal through signal lines 25, 18 and 19 operating in the direction of close is higher than that of the signal line 15 operating in the direction of open, as described above. So, the differential pressure causes the flow dividing compensation valve 22 to move in the direction of close against the spring force of the spring 49.

In the case, if the spring force of the spring 49 is set at a weak level, the pressure at upstream of the check valve 37 approximates boundlessly to the pressure on the signal line 26, that is, the pressure at upstream of the check valve 38, and therefore, the discharge pressure of the pump 1 rises at a level enabling the hydraulic actuator 7 to operate.

Accordingly, even in case that each operating pressure of the hydraulic actuators 6 and 7 are different, simultaneous operation can be surely carried out by means of raising the operating pressure in the light load at the pressure in the heavy load.

By the way, in the load sensing system, pump discharge rate is controlled so that pressure drop at the variable aperture portion always equals to a predetermined value, and therefore the system requires always pressure drop at meter-in portion of the directional control valve, thereby producing energy loss.

On the contrary, in the present invention, it is not necessary to set such a fixed pressure drop at meter-in of the valve into the discharge rate of the pump. Rather, loss at meter-in of the directional control valve can be extremely small by appropriately setting the pressure signal Po for pump discharge and the openings in the variable aperture portions J, K and L of the valve.

Figure 9A:
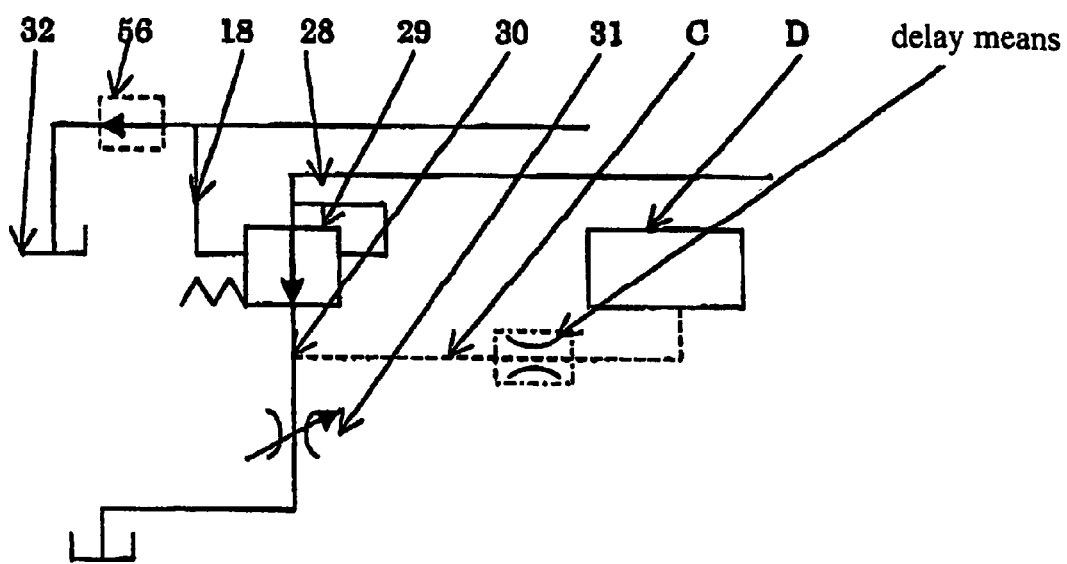
FIGS. 9A and 9B depict a portion of a hydraulic circuit diagram illustrating the use of a delay means and a block means, respectively.
Figure 9B:
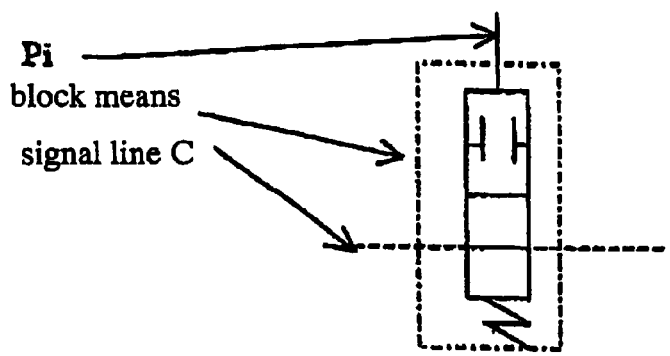
Figure 10:
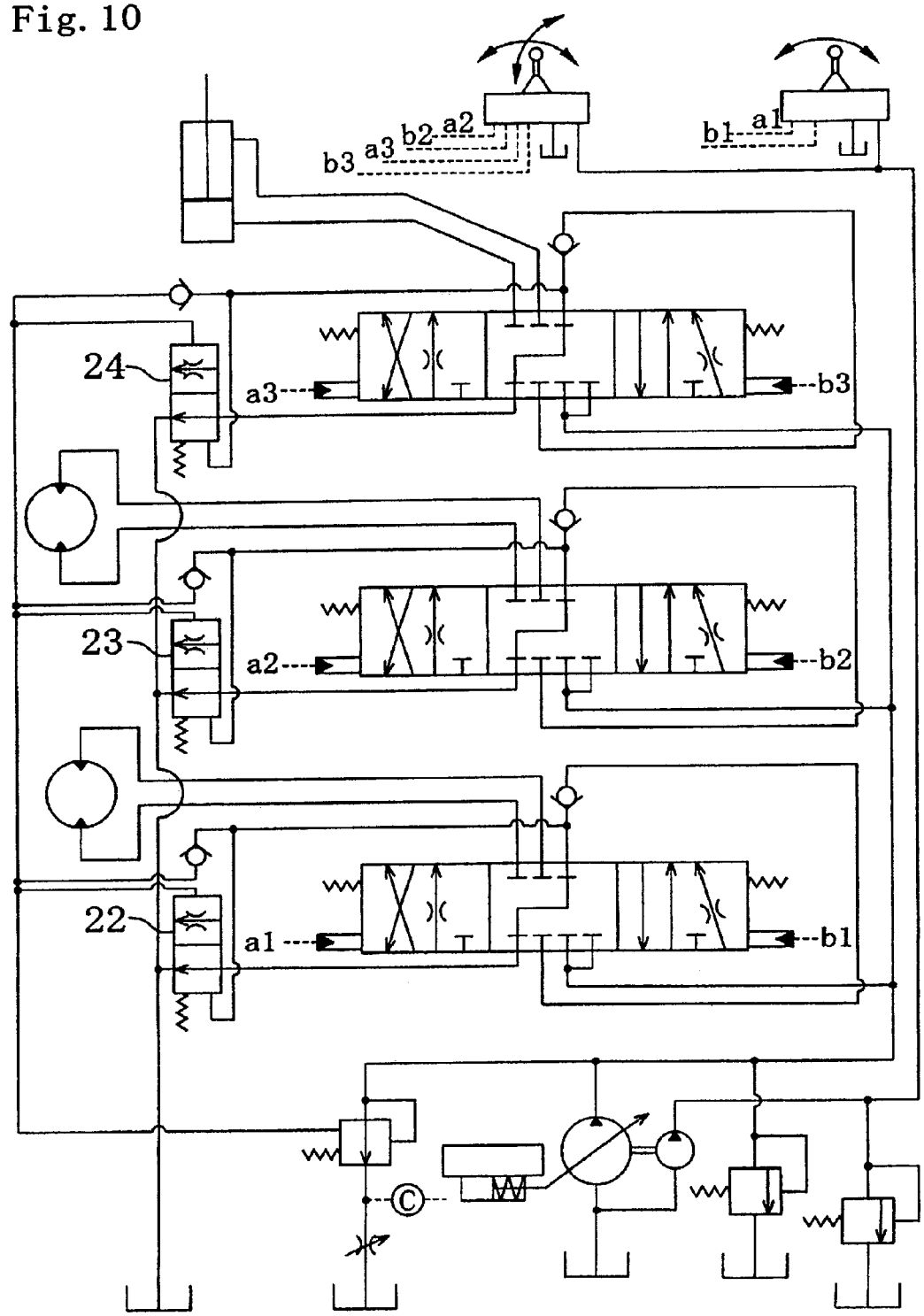
FIG. 10 is illustrative of all flow dividing compensation valves located at each discharge line to the tank from the directional control valve.

FIGS. 9 and 10 show modified arrangements of the flow dividing compensation valve.

FIG. 9 shows one flow dividing compensation valve located at a discharge line to the tank from the directional control valve.

FIG. 10 shows all flow dividing compensation valves 22, 23 and 24 located at each discharge line to the tank from the directional control valve.

As shown in FIGS. 9, 10, the valves 22 and etc. can be located not only at lines between the directional control valve and hydraulic actuator, but also on the way to the tank from the directional control valves, depending upon a device or a machine to which the present invention is applied. Also, each location of the flow dividing compensation valves can be appropriately selected in accordance with the characteristics of each hydraulic actuator with respect to the whole hydraulic control system constitution.

FIGS. 9A and 9B depict a portion of a hydraulic circuit diagram illustrating the use of a delay means and a block means, respectively. In particular, as shown in FIG. 9B, a delay means could be provided to operate as a throttle on signal line C when a pressure signal of signal line C is connected, for example, to an oil chamber 111 of a valve D, as shown in FIG. 3. Alternatively, instead of a delay means, a block means could be implemented to operate as an on-off valve on signal line C.

Figure 11:
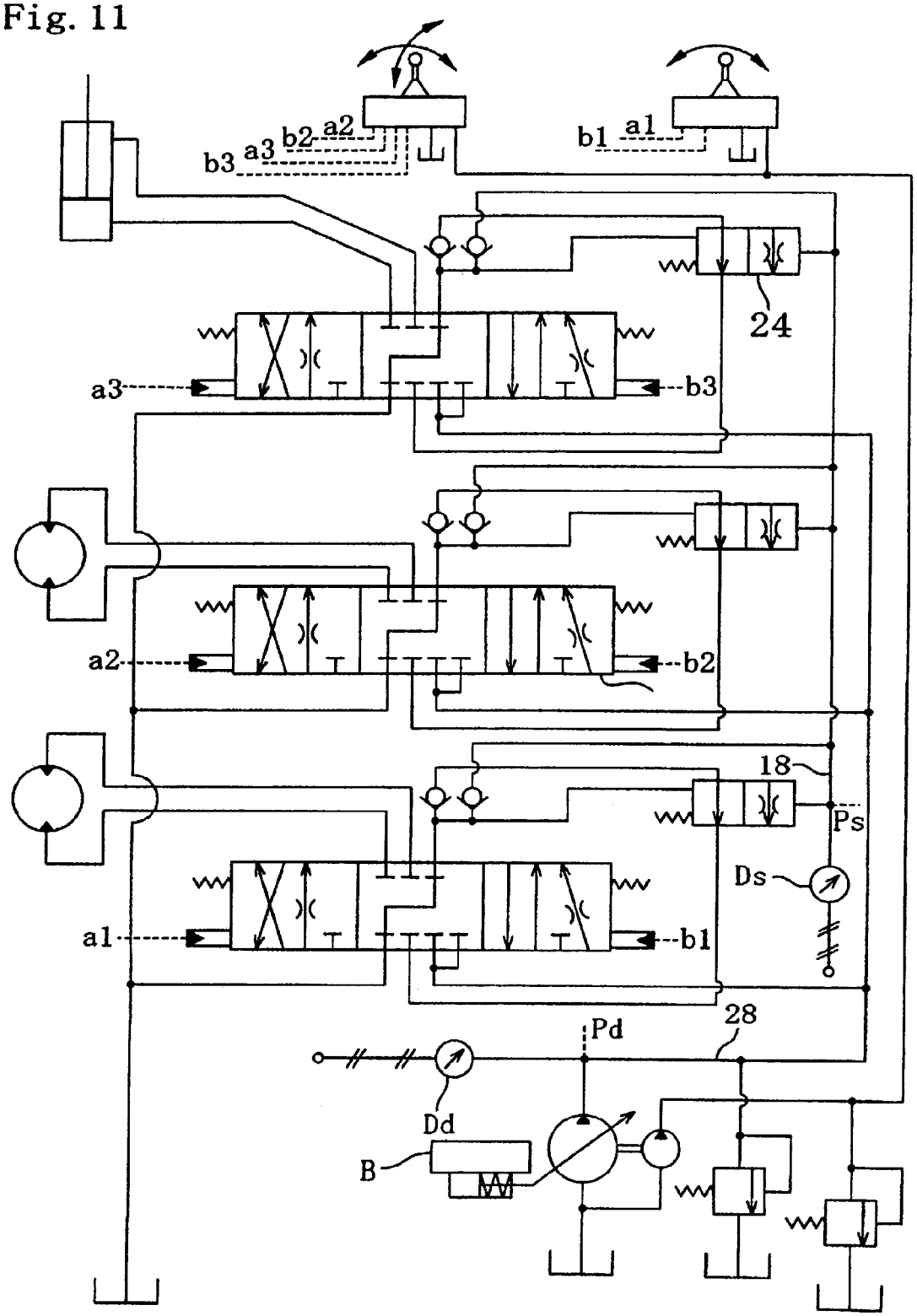
FIG. 11 is illustrative of electrically detecting the pressures Pd, Ps in FIG. 2.
Figure 12:
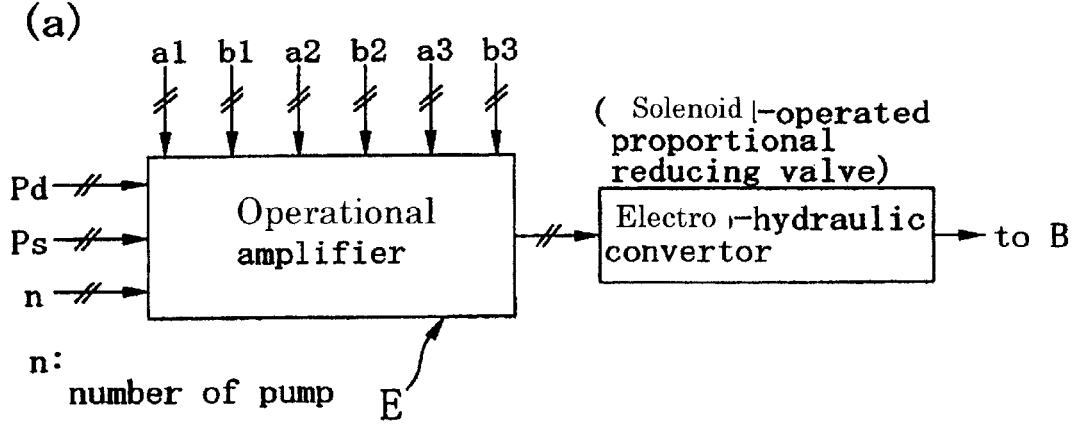
FIG. 12 is an electrical control circuit diagram for controlling the discharge rate control means by electrical signals, wherein (a) illustrates that the output signal of an operational amplifier is applied through an electro-hydraulic converter to the discharge rate control means, and (b) illustrates that the output signal of an operational amplifier is applied to the discharge rate control means providing with a built-in servomotor.
Figure 12:
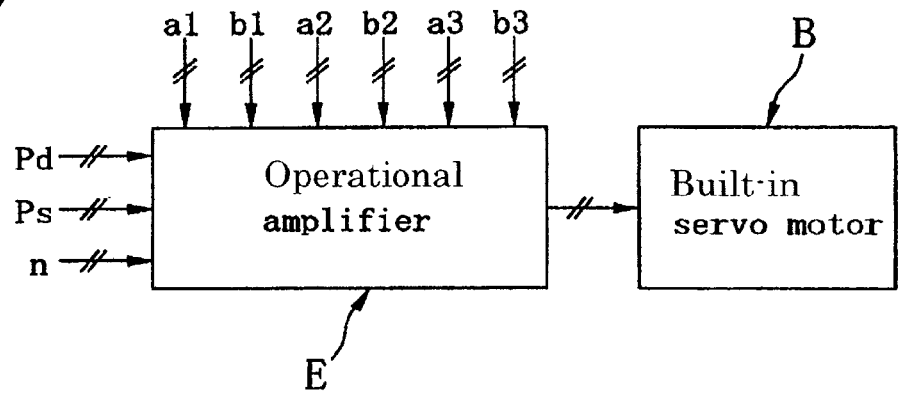

FIG. 11 shows illustrative of electrically detecting the pressures Pd, Ps on the pressure signal lines 18, 28 in FIG. 2 with sensors Dd, Ds, and applying the detected signals through an electrical control means using an operational amplifier E as shown in FIG. 12 (a), (b) to the discharge rate control mechanism B of the variable displacement hydraulic pump.

In the above description for FIG. 2 and FIG. 3, hydraulic signals are used in the embodiment for control. Instead, however, it is possible to electrically operate, detect and operationally amplify discharged oil pressure from pilot operated valves and variable displacement hydraulic pump, and oil pressure of the flow dividing valve with pressure compensation, then to apply the amplified signal to a discharge rate control means of the pump.

In case of such electrical processing, a solenoid-operated proportional reducing valve could be used as a discharge rate control means. Also, an electrical servomotor could be used, which combines with a hydraulic servomechanism by converting its rotation to linear movement.

Besides, depending on a device or machinery to which the present invention is applied, it is possible to get an operating performance better suited for the control object by limiting operating range of the discharge rate control signal Y, and by widening control range of the variable displacement hydraulic pump using only the discharge rate control signal X.

In addition, it is possible to control the operating range of the discharge rate control signal Y by appropriately setting a mounting load of the spring 113 and a moving length L of the shoulder piston 112 in the valve D of FIG. 3. The moving length of the shoulder piston 112 can be adjusted arbitrarily with a stopper for a mechanically adjustable screw mechanism.

Besides, in case that the present invention is applied to a machinery provided with a plurality of hydraulic actuators and that the specific actuator among them becomes always to the heavy load, the flow dividing compensation valve with respect to the directional control valve for operating the actuator concerned can be omitted without loosing advantages of the present invention.

Further, in case that the present invention is applied to hydraulic shovel and that a crane work is carried out by the boom operation, it is preferable to hold the operation quantity for the directional control valve to be fixed regardless of dimension of the load.

In the case, therefore, it is only necessary to reduce the spring force of the spring for setting differential pressure of the flow control valve with pressure compensation, and to control the discharge rate of the variable displacement hydraulic pump so as to hold the differential pressure of the variable aperture portion at the meter-in side of the directional control valve to be constant.

Figure 13:
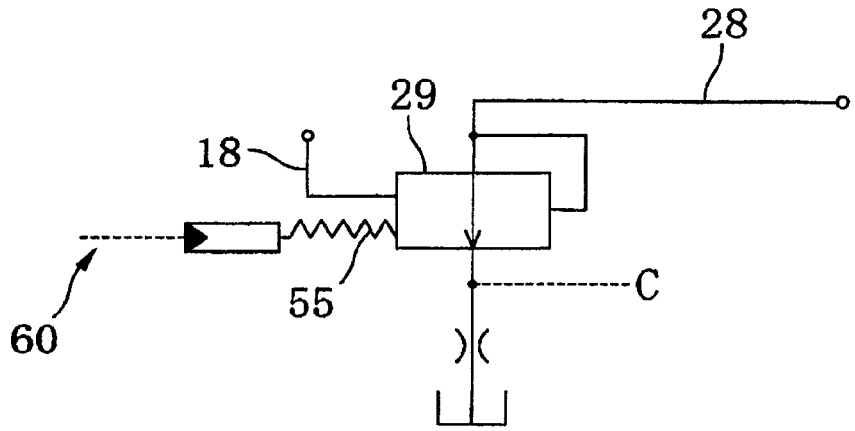
FIG. 13 shows a portion of hydraulic circuit diagram illustrating that force of a spring 55 for setting differential pressure of the flow control valve with pressure compensation is controlled by an external signal.
Figure 14:
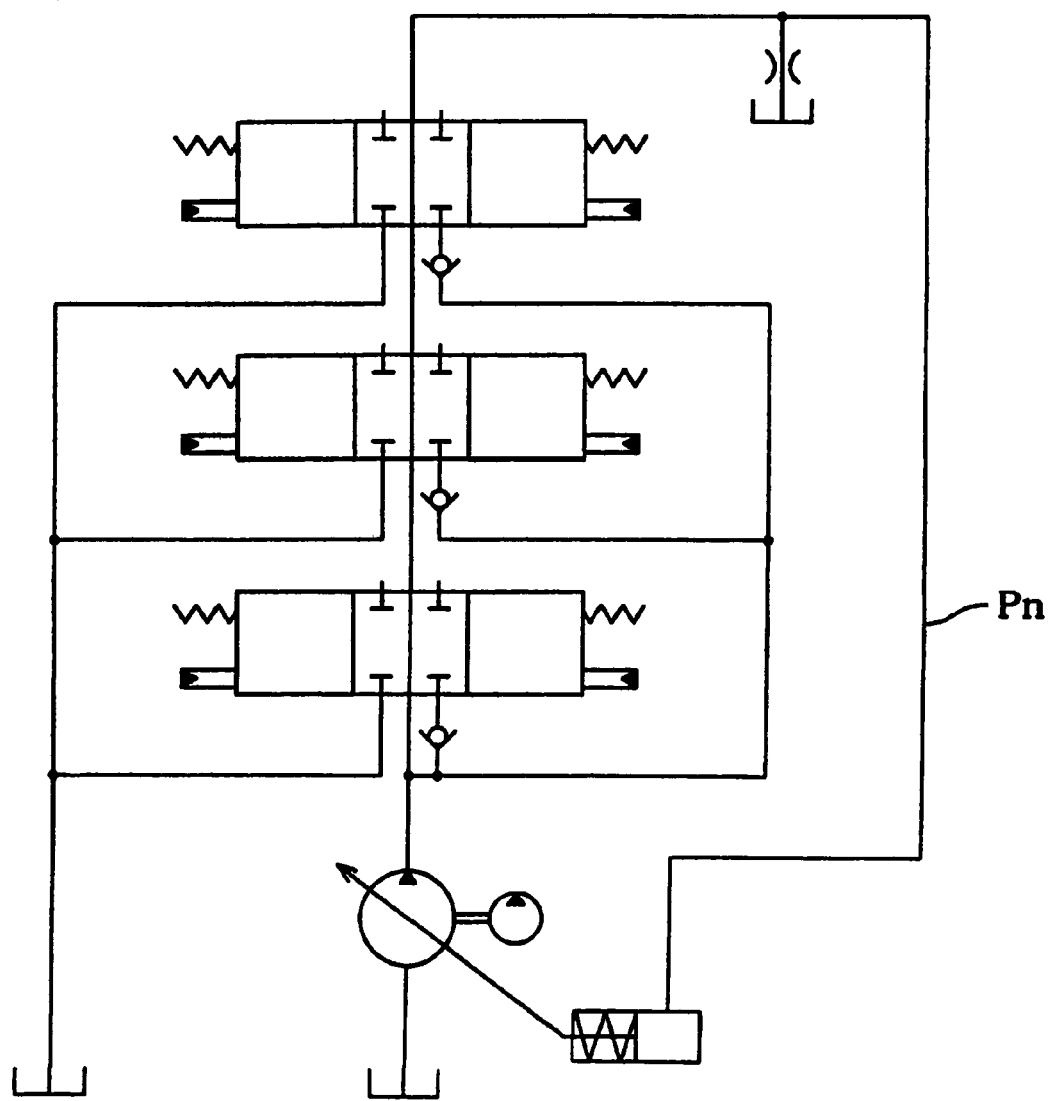
FIG. 14 is a hydraulic circuit diagram illustrative of a conventional Nega-con system outline.
Figure 15:
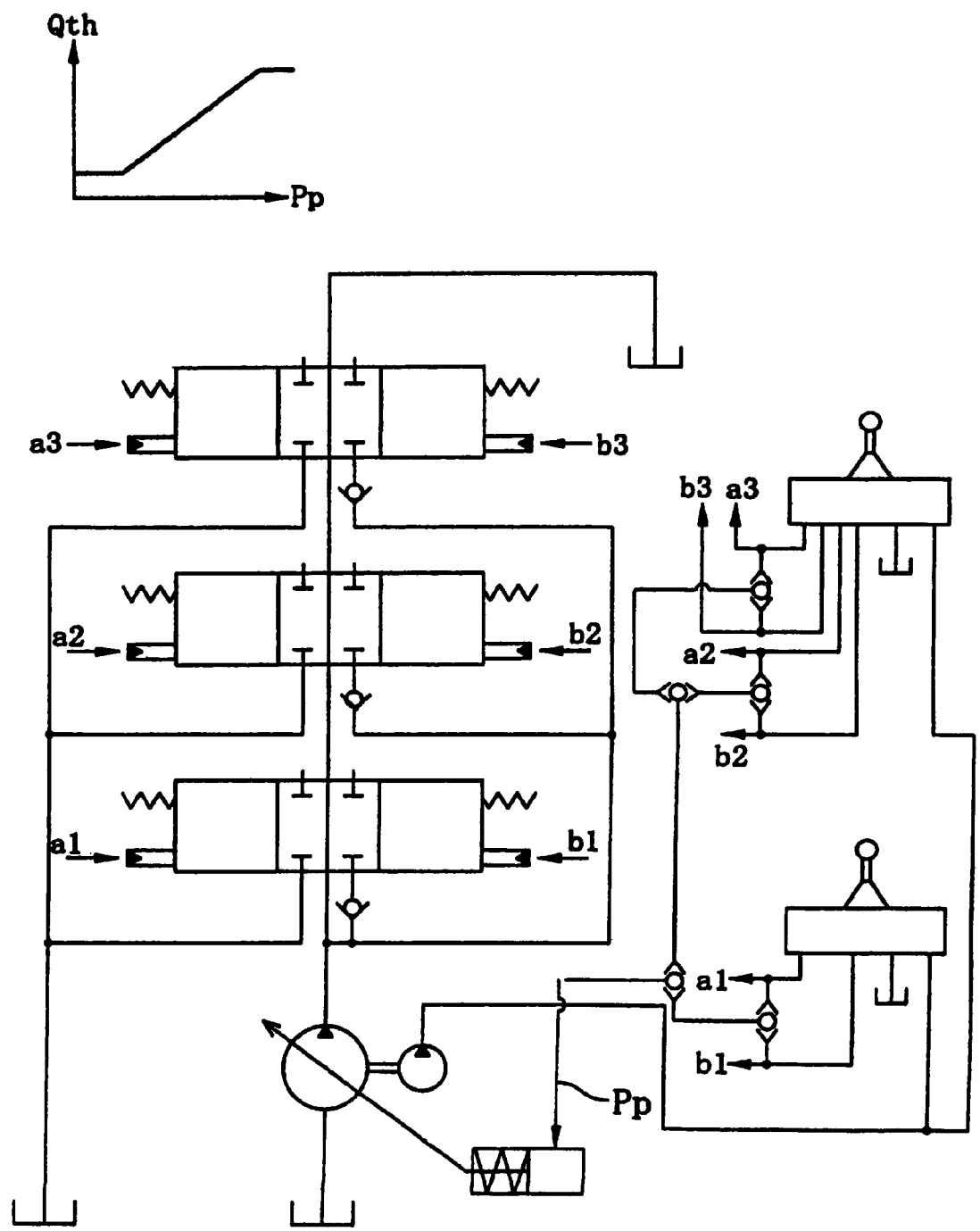
FIG. 15 is a hydraulic circuit diagram illustrative of a conventional Posi-con system outline.
Figure 16:
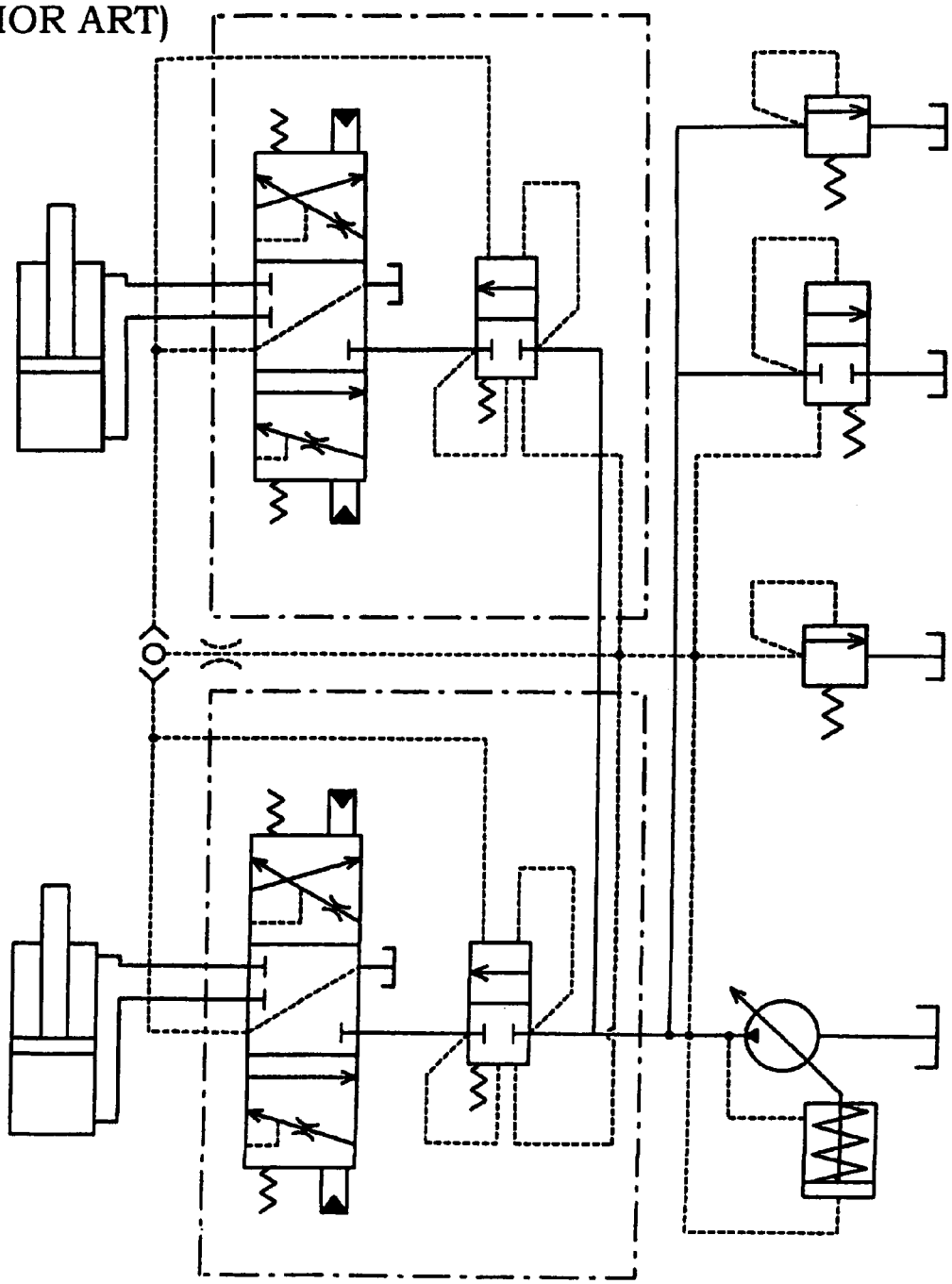
FIG. 16 is a hydraulic circuit diagram illustrative of a conventional load sensing system outline.

Also, in case that a hydraulic actuator is added as an optional device, which maximum flow rate is preferably less than that of the pump, and that the directional control valve for the actuator operates, it is only necessary to control the discharge rate of the pump by adjusting the spring force of the spring 55 for setting differential pressure of the flow control valve 29 with pressure compensation, using the external adjusting means 60 as shown in FIG. 13.

Besides, it enables the hydraulic control system to control the flow rate passing through the bypass in accordance with the intended purpose of the hydraulic control system and the detailed works, that the opening of the pressure generating means 31 is so constituted to be able to externally adjust, thereby saving energy and enhancing operating performance.

The hydraulic control system according to the present invention drastically enhances all of operating performance, response in operation, system efficiency, complex operating performance, diversity of intended purpose and etc., and enables those properties to be compatible in the hydraulic control system for the construction machinery such as a hydraulic shovel wherein a plurality of hydraulic actuators operate at the same time.

Accordingly, the hydraulic control system according to the present invention provides a great contribution to enhancement of productivity, safety and environmental conservation and brings a great improvement from the conventional hydraulic control system.

It should be understood, of course, that the foregoing disclosure relates only to preferred embodiments of the invention, and that it is intended to cover all changes and modifications of the example of the invention herein chosen for the purpose of the disclosure which does not constitute departures from the spirit and scope of the invention set forth in the appended claims.

What is claimed is:

1. A hydraulic control system, comprising:
    a hydraulic actuator configured to perform a predetermined operation by means of pressure oil supply;
    an operation command unit configured to control the predetermined operation of the hydraulic actuator by providing a first control operation signal indicative of a highest pressure oil;
    a directional control valve unit, including a directional control valve, configured to supply pressure oil to the hydraulic actuator in response to the first control operation signal;
    a variable displacement hydraulic pump configured to supply pressure oil to the directional control valve unit;
    a discharge rate control unit that changes a discharge rate of the variable displacement pump in response to the first control operation signal;
    a differential pressure generating unit configured to generate a differential pressure between pressure at a discharge side of the variable displacement hydraulic pump and pressure in pressure oil supplied to the hydraulic actuator from the directional control valve and to output a second control operation signal indicative of the differential pressure;
    a control quantity correcting unit configured to correct the first control operation signal to the discharge rate control unit from the operation command unit based on the second control operation signal outputted by the differential pressure generating unit, wherein the discharge rate of the variable displacement hydraulic pump is adjusted, via the discharge rate control unit, based on the corrected first control operation signal.

2. A hydraulic control system, comprising:

a plurality of directional control valves connected in parallel with a variable displacement hydraulic pump equipped with a discharge rate control means;

a hydraulic actuator connected to each of said directional control valves;

a tank for oil return from each of said directional control valves;

a pilot operated valve for operating said directional control valves so as to cause pressure oil discharged from said variable displacement hydraulic pump to be supplied to said hydraulic actuator and cause oil return from the hydraulic actuator to be discharged to the tank;

a flow dividing compensation valve located between each of said directional control valves and said hydraulic actuator;

a first control signal generating means for generating a discharge rate control signal X to control the discharge rate of said variable displacement hydraulic pump with respect to an operation signal to said directional control valve;

a first pressure detecting means for detecting pressure Pd in pressure oil discharged from said variable displacement hydraulic pump;

a second pressure detecting means for detecting pressure Pu upstream of said flow dividing compensation valve, which is located downstream of a variable aperture portion formed between a supplying line for the pressure oil and a cylinder port in said directional control valve;

a hydraulic circuit for applying said pressure Pu detected by said first pressure detecting means to said flow dividing compensation valve concerned so as to operate in the direction of open, and for applying a maximum pressure Ps to said flow dividing compensation valve concerned so as to operate in the direction of close, said maximum pressure Ps being selected as the highest pressure among said detected pressure Pu corresponding to said each directional control valve; and a second control signal generating means for generating a discharge rate control signal Y to control the discharge rate of said variable displacement hydraulic pump so that the differential pressure (Pd–Ps) between said maximum pressure Ps and said pressure Pd is held within a predetermined value;

said discharge rate control means being controlled by said discharge rate control signals X and Y, thereby controlling the discharge rate of said variable displacement hydraulic pump.

3. A hydraulic control system according to claim 2, further comprising a plurality of additional flow dividing compensation valves corresponding to each of said directional control valves wherein one or more of said additional flow dividing compensation valves are located at a passage for oil return to said tank, and others of said additional flow dividing compensation valves are located at a passage between said directional control valve and said actuator concerned.

4. A hydraulic control system according to claim 2, wherein said discharge rate control signal X is given priority over said discharge rate control signal Y in order to apply to said discharge rate control means of said variable displacement hydraulic pump when a specific hydraulic actuator is operated.

5. A hydraulic control system according to claim 2, wherein a delay means is provided for delaying an output of said discharge rate control signal Y to said discharge rate control signal X with respect to fluctuation of differential pressure.

6. A hydraulic control system according to claim 2, wherein a block means is provided for blocking the output of said discharge rate control signal Y to said discharge rate control signal X.

7. A hydraulic control system according to claim 2, wherein a limit means is provided for limiting range of the output of said discharge rate control signal Y to said discharge rate control signal X.

8. A hydraulic control system according to claim 2, wherein a shunt circuit is provided for hydraulically shunting between a front port and a rear port of said flow dividing compensation valve by taking away one or all of said compensation valves with respect to said directional control valves.

9. A hydraulic control system according to claim 2, wherein an operational amplifier is provided for amplifying at least electrical signals based on an operation quantity of said pilot operated valve and electrical signals based on said detected pressures Pd, Ps, said electrical output of the amplifier being applied to said discharge rate control means of said variable displacement hydraulic pump.

10. A hydraulic control system according to claim 9, wherein said discharge rate control means is constituted by a solenoid-operated proportional reducing valve that operates as an electro-hydraulic converter.

11. A hydraulic control system according to claim 9, wherein a servomotor is provided for controlling discharge rate of said variable displacement hydraulic pump.

12. A hydraulic control system according to claim 2, wherein a pair of said hydraulic control systems are provided, and a single actuator is connected to each directional control valve in the respective hydraulic control system.

13. A hydraulic control system according to claim 2, wherein said discharge rate control signal X is controlled in accordance with fluctuation of revolution of an engine or said variable displacement hydraulic pump by detecting the revolution number.

14. A hydraulic control system comprising:

a plurality of directional control valves connected in parallel with a variable displacement hydraulic pump equipped with a discharge rate control means;

a hydraulic actuator connected to each directional control valve;

a tank for oil return from each directional control valve;

a pilot operated valve for operating the directional control valves so as to cause pressure oil discharged from the variable displacement hydraulic pump to be supplied to the hydraulic actuator and cause oil return from the hydraulic actuator to be discharged to the tank;

a flow dividing compensation valve located between each directional control valve and hydraulic actuator;

a first control signal generating means for generating a discharge rate control signal X to control the discharge rate of the variable displacement hydraulic pump with respect to an operation signal to the directional control valve;

a second control signal generating means for generating a discharge rate control signal Y to control the discharge rate of the variable displacement hydraulic pump so that a differential pressure (Pd-Ps) between a maximum pressure Ps and a pressure Pd of pressure oil discharged from the variable displacement hydraulic pump is held within a predetermined value, the discharge rate control means being controlled by the discharge rate control signals X and Y to control the discharge rate of the variable displacement hydraulic pump;

a first pressure detecting means for detecting the pressure Pd in pressure oil discharged from the variable displacement hydraulic pump;

a second pressure detecting means for detecting pressure Pu upstream of the flow dividing compensation valve, which is located downstream of a variable aperture portion formed between a supplying line for the pressure oil and a cylinder port of each directional control valve;

a hydraulic circuit for applying the pressure Pu detected by the first pressure detecting means to the flow dividing compensation valve so as to operate in the direction of open, and for applying the maximum pressure Ps to the flow dividing compensation valve so as to operate in the direction of close, said maximum pressure Ps being selected as the highest pressure among said detected pressure Pu corresponding to each directional control valve;

a flow control valve with pressure compensation located at a bypass line branched out from a pump supplying line of said variable displacement hydraulic pump for receiving said detected pressure Pd in the direction of open, and for receiving said detected maximum pressure Ps and spring force in the direction of close;

a pressure generating means located at said bypass line and connected to said flow control valve with pressure compensation;

a third pressure detecting means for detecting pressure at a location between said flow control valve with pressure compensation and said pressure generating means; and a variable reducing valve that reduces its secondary pressure in accordance with increase of the pressure detected by said third pressure detecting means;

wherein said discharge rate control signal Y is applied to said variable reducing valve, and said discharge rate control signal X is applied as a primary pressure to said variable reducing valve.

15. A hydraulic control system according to claim 14, wherein said spring force for setting differential pressure in said flow control valve with pressure compensation is controlled by an external signal.

16. A hydraulic control system according to claim 14 or 15, wherein said spring force for setting differential pressure in said flow control valve with pressure compensation is reduced when a specific actuator is operated.

17. A hydraulic control system according to claim 14, wherein an opening degree of said pressure generating means located at said bypass line is controlled by an external signal.

* * * * *